US 9,336,054 B2

United States Patent
Wei et al.

(10) Patent No.: US 9,336,054 B2
(45) Date of Patent: May 10, 2016

(54) METHOD AND APPARATUS FOR CONFIGURING RESOURCE

(71) Applicant: Huawei Device Co., Ltd, Shenzhen (CN)

(72) Inventors: Konggang Wei, Shenzhen (CN); Zhimin Zheng, Shenzhen (CN); Guanghua Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 214 days.

(21) Appl. No.: 13/728,758

(22) Filed: Dec. 27, 2012

(65) Prior Publication Data

US 2014/0013332 A1 Jan. 9, 2014

Related U.S. Application Data

(63) Continuation of application No. PCT/CN2012/078309, filed on Jul. 6, 2012.

(51) Int. Cl.
  *G06F 9/46* (2006.01)
  *G06F 9/50* (2006.01)

(52) U.S. Cl.
  CPC ............ *G06F 9/5005* (2013.01); *G06F 9/5011* (2013.01); *Y02B 60/142* (2013.01)

(58) Field of Classification Search
  None
  See application file for complete search history.

(56) References Cited

U.S. PATENT DOCUMENTS

| | | | |
|---|---|---|---|
| 6,148,324 A * | 11/2000 | Ransom et al. | 718/105 |
| 8,856,266 B2 * | 10/2014 | Zilliacus et al. | 709/217 |
| 2002/0066078 A1 * | 5/2002 | Ishii et al. | 717/126 |
| 2003/0018682 A1 * | 1/2003 | Katayama | 709/102 |
| 2004/0221038 A1 * | 11/2004 | Clarke et al. | 709/226 |
| 2005/0022185 A1 | 1/2005 | Romero | |

(Continued)

FOREIGN PATENT DOCUMENTS

| CN | 1889737 A | 1/2007 |
|---|---|---|
| CN | 101126978 A | 2/2008 |

(Continued)

OTHER PUBLICATIONS

International Search Report issued in corresponding PCT Patent Application No. PCT/CN2012/078309, mailed Apr. 18, 2013, 12 pages.

*Primary Examiner* — Emerson Puente
*Assistant Examiner* — Mehran Kamran
(74) *Attorney, Agent, or Firm* — Brinks Gilson & Lione

(57) ABSTRACT

Embodiments of the present invention disclose a method for configuring a resource and an apparatus. The method includes: allocating a system resource to a currently active application sub-scenario in an application according to recorded system resource occupation information of the application sub-scenario of the application, where the system resource occupation information of the application sub-scenario of the application includes the system resource occupation information recorded when the application sub-scenario works in a process of testing the application after the application sub-scenario of the application is defined. With the present invention, the system resource is configured for the application sub-scenario at a single attempt. Therefore, enough system resources are ensured to meet the requirements for running the currently active application sub-scenario of the application, the running performance is ensured, and the adjustment time and the power consumption are saved.

10 Claims, 3 Drawing Sheets

(56) References Cited

U.S. PATENT DOCUMENTS

| | | |
|---|---|---|
| 2005/0041788 A1* | 2/2005 | Jan et al. .................. 379/88.18 |
| 2006/0150156 A1* | 7/2006 | Cyr et al. ...................... 717/124 |
| 2006/0174249 A1* | 8/2006 | Taniguchi et al. ............ 718/104 |
| 2007/0022406 A1 | 1/2007 | Liu |
| 2007/0078531 A1* | 4/2007 | Adra ............................... 700/31 |
| 2007/0136731 A1* | 6/2007 | Bennington et al. .......... 718/103 |
| 2008/0052719 A1* | 2/2008 | Briscoe et al. ................ 718/104 |
| 2008/0066072 A1* | 3/2008 | Yurekli et al. ................ 718/104 |
| 2008/0320490 A1* | 12/2008 | Biro et al. ..................... 719/313 |
| 2009/0292829 A1 | 11/2009 | Mizuho |
| 2010/0251257 A1* | 9/2010 | Kim et al. ..................... 718/105 |
| 2011/0296392 A1* | 12/2011 | Habib et al. .................. 717/168 |
| 2012/0079497 A1* | 3/2012 | Gangemi et al. ............. 718/104 |
| 2012/0131591 A1* | 5/2012 | Moorthi et al. ............... 718/104 |
| 2013/0013332 A1* | 1/2013 | Frieder et al. ..................... 705/2 |
| 2013/0073601 A1* | 3/2013 | Jenkins et al. ................ 709/201 |
| 2014/0143723 A1* | 5/2014 | Ording et al. ................. 715/823 |

FOREIGN PATENT DOCUMENTS

| | | |
|---|---|---|
| CN | 101833465 A | 9/2010 |
| CN | 102123384 A | 7/2011 |
| CN | 102156530 A | 8/2011 |
| JP | 2005-32242 | 2/2005 |
| JP | 2008-146360 | 6/2008 |
| JP | 2009-230218 | 10/2009 |
| JP | 2009-282730 | 12/2009 |

* cited by examiner

METHOD AND APPARATUS FOR CONFIGURING RESOURCE

CROSS-REFERENCE TO RELATED APPLICATIONS

This application is a continuation of International Application No. PCT/CN2012/078309, filed on Jul. 6, 2012, which is hereby incorporated by reference in its entirety.

FIELD OF THE INVENTION

The present invention relates to the field of system resource management, and in particular, to a method and an apparatus for configuring a resource.

BACKGROUND OF THE INVENTION

In systems of various electronic terminals, various applications exist, for example, a short message application, an e-book application, an MP3 player application, a video player application, and an Internet application. Some of such applications may run in an electronic terminal simultaneously. For example, when an e-book application runs to display an e-book to be read, an MP3 player application may run to play music. However, some applications may conflict with each other. For example, when an Internet application runs to browse a Web page, if a video player application runs at the same time, the experience of browsing the Web page will be affected.

In the prior art, when a user runs multiple applications on an electronic device simultaneously, the electronic device generally puts some of the applications at the background, and puts the application currently operated by the user at the foreground. When an application running at the background is scheduled to the foreground, the prior art may, by configuring more system resources gradually, configure system resources for the application scheduled from the background to the foreground. When the application is scheduled from the background to the foreground, the prior art may configure the system resources for the application in the following mode: at first, configuring more system resource than required for the background application to be scheduled to the foreground, and then reducing the system resource configuration gradually.

The inventor finds that the system resource configuration mode in the prior art fails to allocate system resources according to actual requirements of the application. Consequently, either the resources allocated at first are excessive, which leads to resource waste, or the resources allocated at first are not enough for running the currently operated application smoothly, which affects the user experience.

SUMMARY OF THE INVENTION

Embodiments of the present invention provide a method and an apparatus for configuring a resource to achieve a trade-off between ensuring desirable user experience and reducing system resource waste when an application works.

To solve the foregoing technical problems, in one aspect, an embodiment of the present invention provides a method for configuring a resource, which includes:

allocating a system resource to a currently active application sub-scenario in an application according to recorded system resource occupation information of the application sub-scenario of the application, where the system resource occupation information of the application sub-scenario of the application includes the system resource occupation information recorded when the application sub-scenario works in a process of testing the application after the application sub-scenario of the application is defined.

In another aspect, an embodiment of the present invention further provides an apparatus that includes a processor, where the apparatus includes:

the processor, configured to allocate a system resource to a currently active application sub-scenario in an application according to recorded system resource occupation information of the application sub-scenario of the application, where the system resource occupation information of the application sub-scenario of the application includes the system resource occupation information recorded when the application sub-scenario works in a process of testing the application after the application sub-scenario of the application is defined.

In still another aspect, an embodiment of the present invention further provides an apparatus for configuring a resource, which includes:

a resource configuration module, configured to allocate a system resource to a currently active application sub-scenario in an application according to recorded system resource occupation information of the application sub-scenario of the application.

The apparatus for configuring a resource further includes:

a defining module, configured to define an application sub-scenario of the application according to use scenarios of the application;

a testing module, configured to test the application; and a recording module, configured to record system resource occupation information of a defined application sub-scenario of the application when the application sub-scenario works in the process of testing the application by the testing module.

In still another aspect, an embodiment of the present invention further provides an electronic device, where the electronic device includes the apparatus including the processor, or includes the apparatus for configuring a resource.

The embodiments of the present invention bring the following benefits:

In the embodiments of the present invention, the application in the system is decomposed into application sub-scenarios, and system resources are configured for the application sub-scenarios. Therefore, enough system resources are ensured to meet the requirements for running the application sub-scenarios in the working application, and the running performance is ensured; the system resources are configured for the application sub-scenarios at a single attempt according to the recorded system resource occupation information, and no adjustment is required, which avoids the time waste caused by the adjustment. Moreover, the embodiments of the present invention avoid too much power consumption caused by excessive resources configured at the beginning, make good use of the system resources, reduce the power consumption of the system, and are more helpful for the user to run the currently operated application smoothly.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the description are merely a part rather than all of the embodiments. All other embodiments obtained by persons of ordinary skill in the art based on the embodiments of the present invention without creative efforts shall fall within the protection scope of the present invention.

Figure 1:
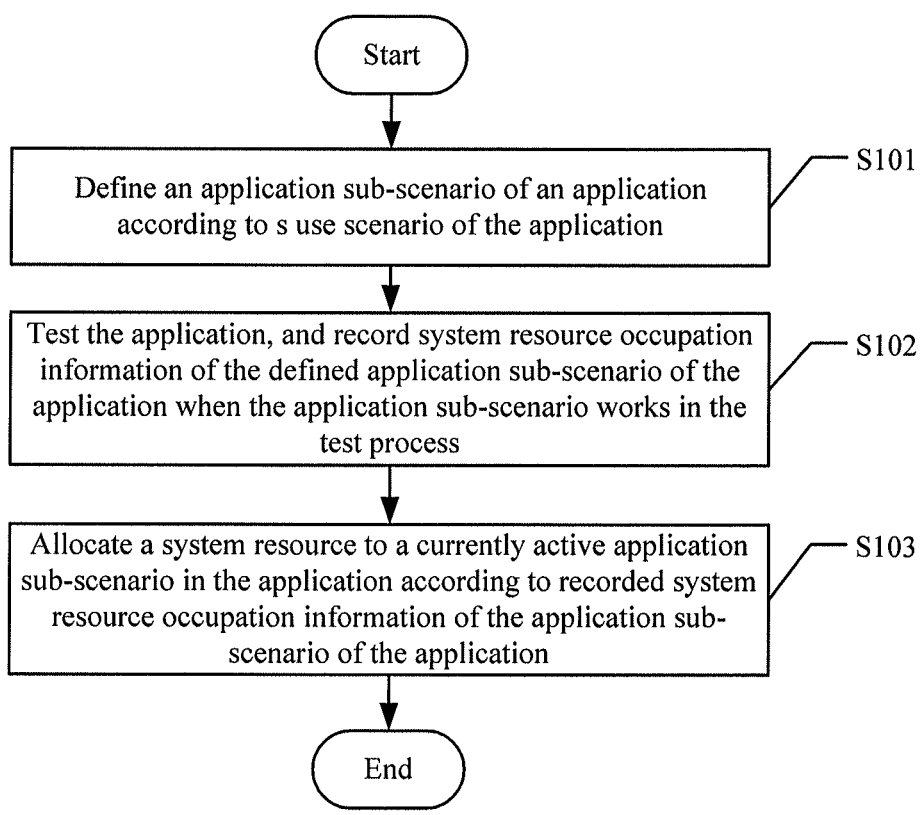
FIG. 1 is a schematic flowchart of a first embodiment of a method for configuring a resource according to the present invention.

FIG. 1 is a schematic flowchart of a first embodiment of a method for configuring a resource according to the present invention. In this embodiment, the method specifically includes:

S101: Define an application sub-scenario of an application according to use scenarios of the application.

S102: Test the application, and record system resource occupation information of a defined application sub-scenario of the application when the application sub-scenario works in the test process.

S101 and S102 are a process of presetting the system resource occupation information of the application sub-scenarios of the application in an electronic device, and may be performed anytime before the application works.

When the electronic device is delivered out of a factory, the technical staff may define the application in the electronic device according to use scenarios, so as to obtain the application sub-scenarios of the application. For example, for an e-book application, the application scenarios of the e-book application may include: a text browsing scenario, a page turning scenario, and a bookmark adding scenario; and the technical staff may define application sub-scenarios such as a text browsing application sub-scenario, a page turning application sub-scenario, and a bookmark adding application sub-scenario.

After the application sub-scenarios of the application are defined, the application needs to be tested. The detailed test process is: causing the application to be in a working state, and operating the application to cause the application sub-scenarios in the application to be also in the working state; recording the system resource consumption situation when an application sub-scenario of the application is in the normal working state, and using the recorded system resource consumption situation of each application sub-scenario as the system resource occupation information of the corresponding application sub-scenario.

While a user uses the electronic device, a new application may be installed in the electronic device as required. When a newly added application is detected, the application sub-scenarios of the newly added application may be defined in the mode as described in S101 and S102; the newly added application is tested, and the system resource occupation information of an application sub-scenario defined for the newly added application is recorded when the application sub-scenario works in the test process.

While the user uses the electronic device, it is possible that the application is upgraded, or that a use scenario (such as a function) of the application is deleted, or that a new use scenario (such as a function) is added for the application, and so on, which leads to modification of the application. When modification of the application is detected, the application sub-scenarios of the modified application may also be defined in the mode described in S101 and S102; the modified application is tested, and the system resource occupation information of an application sub-scenario defined for the modified application is recorded when the application sub-scenario works in the test process.

While the user uses the electronic device, the user may delete an application as required, and/or delete a use scenario (such as a function) in an application. When deletion of an application is detected and/or deletion of an application sub-scenario of an application is detected, it is necessary to correspondingly delete the application sub-scenarios defined for the deleted application and system resource occupation information of the application sub-scenarios, and/or correspondingly delete the deleted application sub-scenario of the application and system resource occupation information of the application sub-scenario.

S101 and S102 are preparatory steps of step S103 below, and are not necessarily included in this embodiment. When the user of the electronic device uses the application and causes it to work, the following S103 is performed.

S103: Allocate system resources to a currently active application sub-scenario of the application according to recorded system resource occupation information of the application sub-scenario of the application.

The system resources include any one or more of the following: system memory resources, system CPU resources, system frequency resources, and network service resources.

When the application in the electronic device works, no matter whether a new application sub-scenario is started or an application sub-scenario is switched to another application sub-scenario, a system resource need to be allocated to the currently active application sub-scenario of the working application in the mode described in S103.

Specifically, when the application works, system resources are immediately allocated to the currently active application sub-scenario according to the recorded system resource occupation information of the application sub-scenario of the application.

Specifically, a resource configuration mapping table may be set, and, in S101 and S102, identifiers of the application sub-scenarios of the application and the system resource occupation information of the application sub-scenarios may be stored in the resource configuration mapping table. While the application works, a system resource configuration operation is performed for the currently active application sub-scenario of the application according to the resource configuration mapping table directly.

The embodiment of the present invention bring the following benefits:

In this embodiment of the present invention, the application in the system is decomposed into application sub-scenarios, and system resources are configured for the application sub-scenarios. Therefore, enough system resources are ensured to meet the requirements for running the application sub-scenarios in the working application, and the running performance is ensured; the system resources are configured for the application sub-scenarios at a single attempt according to the recorded system resource occupation information, and no adjustment is required, which avoids the time waste caused by the adjustment. Moreover, this embodiment avoids too much power consumption caused by excessive resources configured at the beginning, makes good use of the system resources, reduces the power consumption of the system, and is more helpful for the user to run the currently operated application smoothly.

Figure 2:
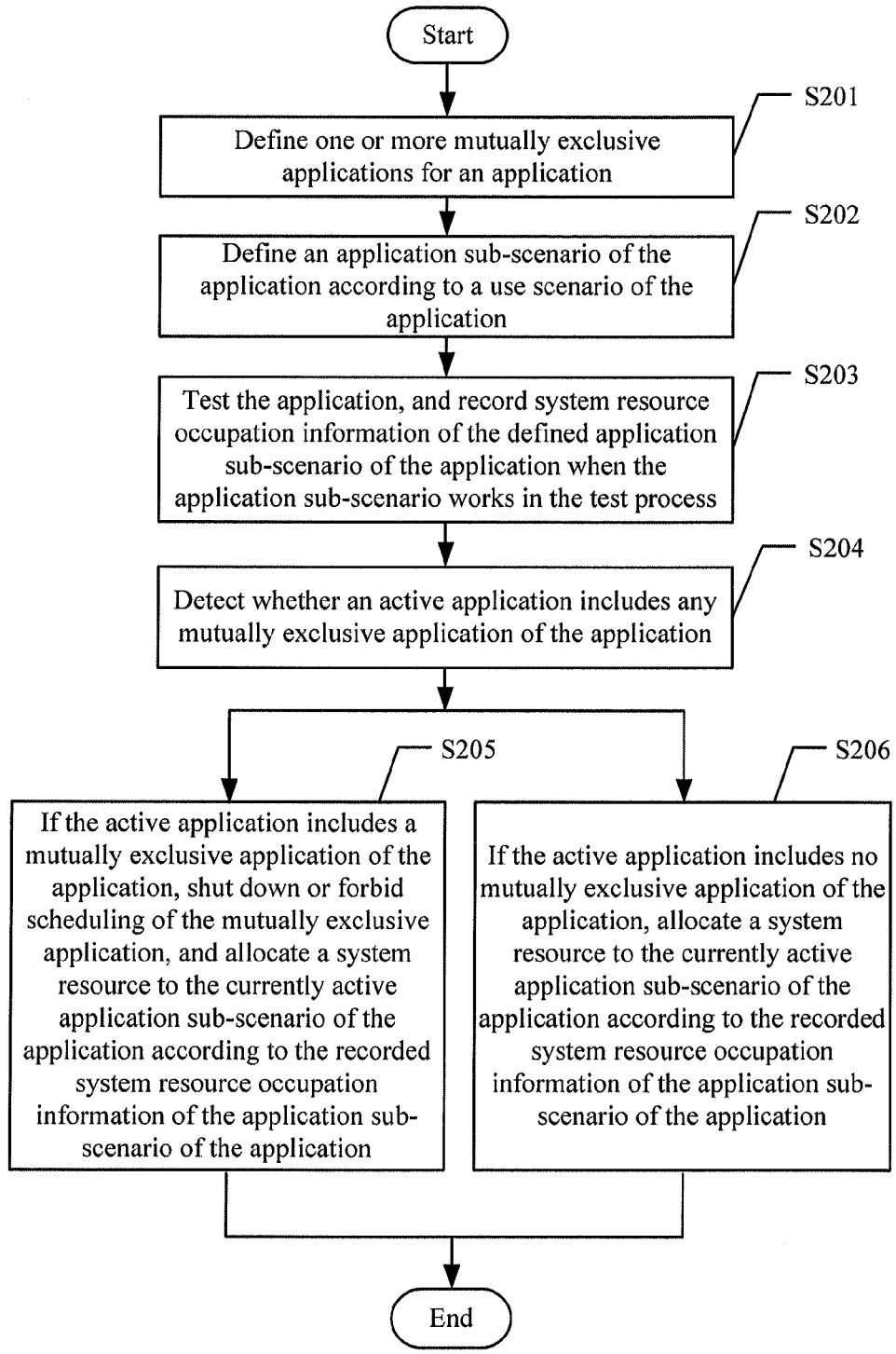
FIG. 2 is a schematic flowchart of a second embodiment of a method for configuring a resource according to the present invention.

FIG. 2 is a schematic flowchart of a second embodiment of a method for configuring a resource according to the present invention. The method for configuring a resource in this embodiment specifically includes:

S201: Define one or more mutually exclusive applications for an application.

Specifically, one preset mapping table of mutually exclusive applications may record all mutually exclusive applications corresponding to an application. An identifier of the application and identifiers of its mutually exclusive applications are correspondingly stored in the mapping table of mutually exclusive applications. Therefore, when the application works subsequently, it is easy to determine, according to the application identifier and the identifiers of its mutually exclusive applications, whether the active applications of the system include any mutually exclusive application of the application.

In this embodiment, by maintaining a mapping table of mutually exclusive applications, which reflects the mutually exclusive relationships between all local applications of an electronic device, one or more mutually exclusive applications are defined for an application in the electronic device. The mapping table of mutually exclusive applications records the identifier of the application and correspondingly records identifiers of other applications in a mutually exclusive relationship with the application, namely, identifiers of mutually exclusive applications, and the mutually exclusive applications corresponding to the application may be configured by a user. The mapping table of mutually exclusive applications may be shown in Table 1.

TABLE 1

| Application identifier | Mutually exclusive application identifier |
| --- | --- |
| Identifier of short message application | Identifier of e-book application, identifier of video player application, and identifier of Internet application |
| Identifier of e-book application | Identifier of video player application, identifier of Internet application, and identifier of short message application |
| ... | ... |
| Identifier of MP3 player application | Identifier of video player application |

S202: Define application sub-scenarios of the application according to use scenarios of the application.

S203: Test the application, and record system resource occupation information of a defined application sub-scenario of the application when the application sub-scenario works in the test process.

Also, in this embodiment, the identifiers of application sub-scenarios of each local application of the electronic device and the system resource occupation information of the application sub-scenarios are correspondingly stored in a resource configuration mapping table. The resource configuration mapping table may be as shown in Table 2, where the system resource occupation information corresponding to a page turning application sub-scenario and a bookmark adding application sub-scenario of the e-book application are recorded.

TABLE 2

| Page turning application sub-scenario | System frequency SYS_freq: 1000 MHz Processor CPU: 35% Memory MEM: 70 Mbytes |
| --- | --- |
| Bookmark adding application sub-scenario | System frequency SYS_freq: 700 MHz Processor CPU: 20% Memory MEM: 50 Mbytes |

It should be noted that Table 2 is only an example. For example, the system resource occupation information in Table 2 may further include the occupation information of a network service Network resource, and so on, as shown in Table 3 below:

TABLE 3

| Page turning application sub-scenario | Processor CPU: 35% Memory MEM: 70 Mbytes Network service Network: 15 Mbps |
| --- | --- |
| Bookmark adding application sub-scenario | Processor CPU: 20% Memory MEM: 50 Mbytes Network service Network: 2 Mbps |

S201-S203 are a process of presetting system resource configuration information for the application. In this way, system resources can be configured for the application with respect to the application sub-scenarios while the application works subsequently.

When it is detected that the application in the electronic device begins working, the following step may also be performed for the application.

S204: Detect whether an active application includes any mutually exclusive application of the application.

For example, an active application of the system may be detected by reading the active application recorded in a system task manager.

According to the mapping table of mutually applications in Table 1, when the user starts a new application, an entry corresponding to the identifier of the application is found first, and then the identifiers of the mutually exclusive applications corresponding to the entry are found, and, according to the identifiers, the active applications are checked for any mutually exclusive application of the application that begins working.

In this embodiment, the detecting the active applications in S204 includes:

detecting the identifier of the application and the identifier of each active application;

judging whether the identifiers of the mutually exclusive applications corresponding to the application identifier include the identifier of the active application detected; and if so, determining that the active applications include the mutually exclusive application of the application, and proceeding to S205; otherwise, determining that the active applications do not include the mutually exclusive application of the application, and proceeding to S206.

Specifically, every application has its unique universal name. This name may serve as the identifier of the application. For example, the universal name iexplore of the Web browser of Microsoft may serve as the identifier of the Microsoft browser; the universal name kugou of an MP3 player application may serve as the identifier of the application Kugou; the universal name 360sd of the 360 Web browser may serve as the identifier of the 360 Web browser. According to the identifier of the application and the identifiers of the detected active applications, the mapping table of mutually exclusive applications in Table 1 may be searched to check whether the active applications of the electronic device include any mutually exclusive application of the application.

Nevertheless, in other embodiments, it is appropriate to check whether the active applications include any mutually exclusive application of the application intelligently according to the resources to be occupied by a newly started application. For example, a video player application newly started by the user needs to occupy the display resource and the speaker resource, but it is detected that an MP3 player application in the active applications already occupies the speaker resource, and therefore, it is determined that the active applications include the mutually exclusive application, which is the MP3 player application, of the newly started video player application.

S205: If the active applications include a mutually exclusive application of the application, shut down or forbid scheduling of the mutually exclusive application, and allocate system resources to the currently active application sub-scenario of the application according to the recorded system resource occupation information of the application sub-scenario of the application.

S206: If the active applications include no mutually exclusive application of the application, allocate a system resource to the currently active application sub-scenario of the application according to the recorded system resource occupation information of the application sub-scenario of the application.

The allocating the system resources to the application in S205 and S206 is: allocating system resources to the currently active application sub-scenario according to the system resource occupation information corresponding to the identifier of the currently active application sub-scenario of the application in the resource configuration mapping table shown in Table 2.

S206 specifically includes: determining the identifier of the currently active application sub-scenario when the application works; and allocating system resources to the currently active application sub-scenario of the application according to the system resource occupation information corresponding to the identifier of the application sub-scenario of the application in the resource configuration mapping table.

In this embodiment of the present invention, on one hand, the application in the system is decomposed into application sub-scenarios, and system resources are configured for the application sub-scenarios. Therefore, enough system resources are ensured to meet the requirements for running the application sub-scenarios in the working application, and the running performance is ensured; the system resources are configured for the application sub-scenarios at a single attempt according to the recorded system resource occupation information, and no adjustment is required, which avoids the time waste caused by the adjustment. Moreover, this embodiment avoids too much power consumption caused by excessive resources configured at the beginning, makes good use of the system resources, reduces the power consumption of the system, and is more helpful for the user to run the currently operated application smoothly.

On the other hand, this embodiment of the present invention defines mutually exclusive applications of each application in the system. When an application is started, its mutually exclusive application that runs at the background is detected and shut down, or scheduling of the mutually exclusive application is stopped, which avoids system resource waste caused by the mutually exclusive application that runs at the background. Therefore, the system resources are saved, the power consumption of the system is further reduced, more system resources are released and available to the new active application, and the user is facilitated to run and use the application.

The following is a detailed description of a first apparatus according to an embodiment of the present invention.

The first apparatus in this embodiment of the present invention is arranged in an electronic device. The first apparatus can manage and test the application in the electronic device, and configure resources when the application works, and so on.

In this embodiment of the present invention, the first apparatus includes a processor configured to allocate system resources to a currently active application sub-scenario in an application according to recorded system resource occupation information of the application sub-scenario of the application.

The system resource occupation information of the application sub-scenario of the application includes the system resource occupation information recorded when the application sub-scenario works in a process of testing the application after the application sub-scenario of the application is defined.

Specifically, before the application works, the processor is further configured to: define the application sub-scenarios of the application according to the use scenarios of the application, test the application, and record the system resource occupation information of a defined application sub-scenario of the application when the application sub-scenario works in the test process.

For example, for an e-book application, the application scenarios of the e-book application may include: a text browsing scenario, a page turning scenario, a bookmark adding scenario, and so on. Through the processor, application sub-scenarios such as a text browsing application sub-scenario, a page turning application sub-scenario, and a bookmark adding application sub-scenario may be defined.

After the application sub-scenarios of the application are defined, the processor tests the application so that the application is in a working state. Meanwhile, when the corresponding application sub-scenario of the application is in the normal working state, the processor records a system resource consumption situation of the application sub-scenario of the application, and uses the recorded system resource consumption situation of each application sub-scenario as the system resource occupation information of the application sub-scenario.

While a user uses the electronic device, a new application may be installed into the electronic device as required. The processor may be further configured to: when a newly added application is detected, define application sub-scenarios of the newly added application according to the use scenarios of the newly added application; test the newly added application, and record the system resource occupation information of a defined application sub-scenario of the newly added application when the application sub-scenario works in the test process.

While the user uses the electronic device, it is possible that the application is upgraded, or that a use scenario (such as a function) of the application is deleted, or that a new use scenario (such as a function) is added for the application, and so on, which leads to modification of the application. The processor may be further configured to: when modification of the application is detected, define application sub-scenarios of the modified application according to use scenarios of the modified application; test the modified application, and record system resource occupation information of a defined application sub-scenario of the modified application when the application sub-scenario works in the test process.

While the user uses the electronic device, the user may delete an application as required, and/or delete a use scenario (such as a function) of an application. The processor may be further configured to: when deletion of an application is detected, delete the application sub-scenario defined for the deleted application and system resource occupation information of the application sub-scenario, and/or, may be further configured to: when deletion of an application sub-scenario of an application is detected, delete the deleted application sub-scenario of the application and system resource occupation information of the application sub-scenario.

The embodiments of the present invention bring the following benefits:

In this embodiment of the present invention, the application in the system is decomposed into application sub-scenarios, and system resources are configured for the application sub-scenarios. Therefore, enough system resources are ensured to meet the requirements for running the application sub-scenarios in the working application, and the running performance is ensured; the system resources are configured for the application sub-scenarios at a single attempt according to the recorded system resource occupation information, and no adjustment is required, which avoids the time waste caused by the adjustment. Moreover, this embodiment avoids too much power consumption caused by excessive resources configured at the beginning, makes good use of the system resources, reduces the power consumption of the system, and is more helpful for the user to run the currently operated application smoothly.

Figure 3:
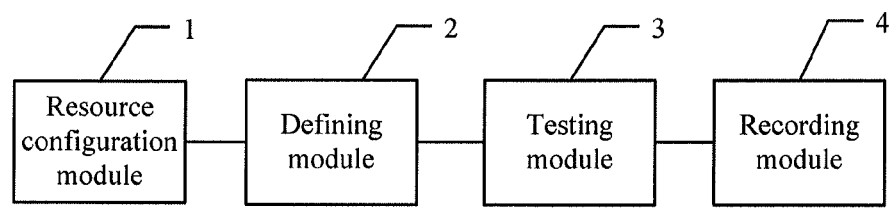
FIG. 3 is a schematic structural diagram of a first embodiment of an apparatus for configuring a resource according to the present invention.

FIG. 3 is a schematic structural diagram of a first embodiment of an apparatus for configuring a resource according to the present invention. The apparatus for configuring a resource according to the present invention is arranged in various electronic devices capable of running applications, such as a mobile phone, a personal digital assistant, and so on, and specifically includes:

a resource configuration module 1, configured to allocate system resources to a currently active application sub-scenario in an application according to recorded system resource occupation information of the application sub-scenario of the application.

When the application works, according to the recorded system resource occupation information of the application sub-scenario of the application, the resource configuration module 1 allocates system resources to the currently active application sub-scenario of the application immediately; if an application sub-scenario is switched while the application works, when it is detected that the user has switched the active application sub-scenario to a target application sub-scenario (corresponding to the currently active application sub-scenario), the resource configuration module 1 allocates system resources to the target application sub-scenario according to the recorded system resource occupation information of the target application sub-scenario.

The apparatus for configuring a resource further includes a defining module 2, a testing module 3, and a recording module 4, so as to define application sub-scenarios of the application and determine system resource occupation information of the application sub-scenarios.

The defining module 2 is configured to define application sub-scenarios of the application according to use scenarios of the application.

The testing module 3 is configured to test the application.

The recording module 4 is configured to record system resource occupation information of a defined application sub-scenario of the application when the application sub-scenario works in the process of testing the application by the testing module 3.

The application has one or more specific use scenarios. For example, for an e-book application, the use scenarios of the e-book application include: a page turning use scenario, a bookmark adding use scenario, and so on. Therefore, the e-book application correspondingly includes the application sub-scenarios such as a page turning application sub-scenario and a bookmark adding application sub-scenario. The defining module 2 may define the application and determine application sub-scenarios of the application.

After the application sub-scenarios of the application are defined, the user uses the testing module 3 to test the application to cause the application to enter the working state, and uses the recording module 4 to record the system resources consumed by the corresponding application sub-scenario of the application. Specifically, through the testing module 3, the user may cause the application to work in different application scenarios. Also taking the e-book as an example, operations such as page turning and bookmark adding may be performed for the e-book, and the recording module 4 records system resource consumption situations in such scenarios, and uses the system resource consumption situations as system resource occupation information of the application sub-scenarios such as the page turning application sub-scenario and the bookmark adding application sub-scenario of the e-book application.

At the time of testing the application to cause it to work, the recording module 4 automatically records the system resource occupation information corresponding to an operation in the process of using the application. Therefore, when the application works subsequently, the resource configuration module 1 can allocate system resources to the application properly and accurately by using the specific application sub-scenario of the application as a basic unit.

The system resources include any one or more of the following: system memory resources, system CPU resources, system frequency resources, and network service resources.

The recording module 4 may correspondingly store identifiers of application sub-scenarios of the application and the system resource occupation information of the application sub-scenarios in a preset resource configuration mapping table. While the application works, the resource configuration module 1 may configure system resources for the currently active application sub-scenario of the working application directly according to the resource configuration mapping table recorded by the recording module 4.

Based on the embodiments described above, the present invention has the following advantages:

In this embodiment of the present invention, the application in the system is decomposed into application sub-scenarios, and system resources are configured for the application sub-scenarios. Therefore, enough system resources are ensured to meet the requirements for running the application sub-scenarios in the working application, and the running performance is ensured; the system resources are configured for the application sub-scenarios at a single attempt according to the recorded system resource occupation information, and no adjustment is required, which avoids the time waste caused by the adjustment. Moreover, this embodiment avoids too much power consumption caused by excessive resources configured at the beginning, makes good use of the system resources, reduces the power consumption of the system, and is more helpful for the user to run the currently operated application smoothly.

Figure 4:
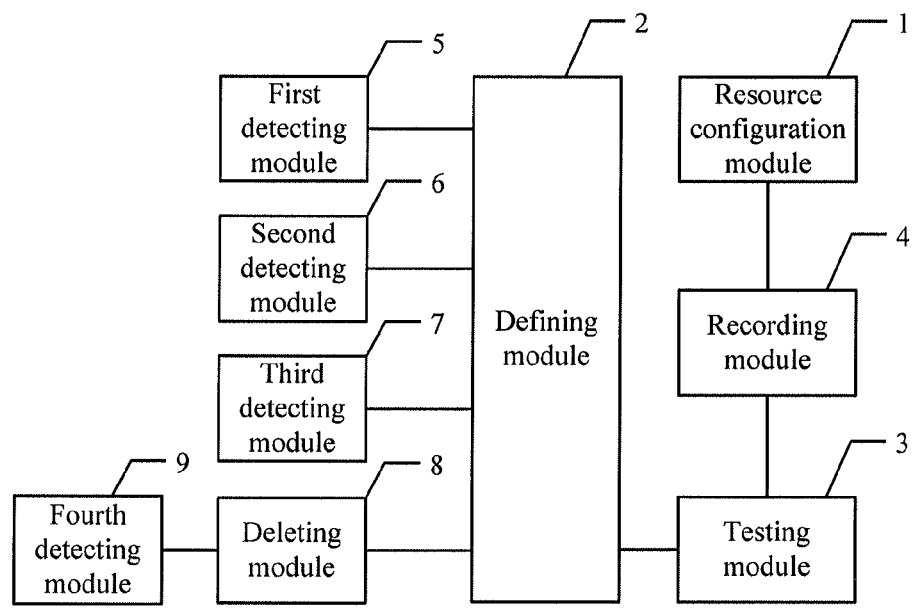
FIG. 4 is a schematic structural diagram of a second embodiment of an apparatus for configuring a resource according to the present invention.

FIG. 4 is a schematic structural diagram of a second embodiment of an apparatus for configuring a resource according to the present invention. The apparatus for configuring a resource in this embodiment may be arranged in various intelligent electronic devices to manage all applications in the intelligent electronic devices and manage resource consumption situations of all applications. The apparatus for configuring a resource in this embodiment specifically includes the resource configuration module 1, the defining module 2, the testing module 3, and the recording module 4 in the first apparatus embodiment described above. In this embodiment, the apparatus for configuring a resource may further include: a first detecting module 5, a second detecting module 6, a third detecting module 7, a fourth detecting module 8, and a deleting module 9. Understandably, the functions of the first detecting module 5, the second detecting module 6, the third detecting module 7, and the fourth detecting module 8 may be implemented by one detecting module.

Specifically, the first detecting module 5 is configured to detect whether a new application is added.

The defining module 2 is further configured to define application sub-scenarios of the newly added application according to use scenarios of the newly added application when the first detecting module 5 detects that the newly added application is added.

The testing module 3 is further configured to test the newly added application.

The recording module 4 is further configured to record system resource occupation information of a defined application sub-scenario of the newly added application when the application sub-scenario works in the test process.

Through the first detecting module 5, the defining module 2, the testing module 3, and the recording module 4, the user can configure system resources for a newly installed application, so that system resources can be configured for the newly added application at a single attempt directly when the newly added application works subsequently.

The second detecting module 6 is configured to detect whether an application is modified.

The defining module 2 is further configured to define application sub-scenarios of the modified application according to use scenarios of the modified application when the second detecting module 6 detects modification of the application.

The testing module 3 is further configured to test the modified application.

The recording module 4 is further configured to record system resource occupation information of a defined application sub-scenario of the modified application when the application sub-scenario works in the test process.

Through the second detecting module 6, the defining module 2, the testing module 3, and the recording module 4, modification of the application in the electronic device is detected in real time. For example, when the application is upgraded, or a use scenario of the application is deleted, or a new use scenario of the application is added, a system resource configuration process is performed for the modified application. Therefore, system resources can be configured for the newly added application at a single attempt directly when the modified application works subsequently.

The third detecting module 7 is configured to detect whether an application is deleted.

The deleting module 9 is configured to delete the application sub-scenarios defined for the deleted application and system resource occupation information of the application sub-scenarios when the third detecting module detects deletion of the application.

The fourth detecting module 8 is configured to detect whether an application sub-scenario of the application is deleted.

The deleting module 9 is further configured to delete the deleted application sub-scenario of the application and system resource occupation information of the application sub-scenario when the fourth detecting module detects deletion of the application sub-scenario of the application.

Through the third detecting module 7, the fourth detecting module 8, and the deleting module 9, the deletion of the application in the electronic device or certain use scenarios of the application may be detected in real time. When the deletion occurs, the relevant application sub-scenarios and their system resource occupation information recorded by the recording module 4 can be deleted, and therefore, the apparatus for configuring a resource can better configure system resources for other applications.

Further, in this embodiment, the apparatus for configuring a resource includes:

a setting module, configured to define one or more mutually exclusive applications for an application in the system; and a mutual exclusiveness detecting module, configured to detect whether an active application includes any mutually exclusive application of the application.

The resource configuration module 1 is specifically configured to: if the mutual exclusiveness detecting module detects that the active application includes a mutually exclusive application of the application, control to shut down or forbid scheduling of the mutually exclusive application, and allocate system resources to the currently active application sub-scenario of the application according to the recorded system resource occupation information of the application sub-scenario of the application; and, further configured to: if the active application includes no mutually exclusive application of the application, allocate system resources to the currently active application sub-scenario of the application according to the recorded system resource occupation information of the application sub-scenario of the application.

Specifically, when the mutual exclusiveness detecting module detects a mutual exclusive application of the application, the resource configuration module 1 may specifically use a control unit to control to shutdown of or forbid scheduling of the mutually exclusive application, and the resource configuration module 1 may specifically use a configuration unit to allocate system resources to the currently active application sub-scenario of the application according to the recorded system resource occupation information of the application sub-scenario of the application.

Further, specifically, the mutual exclusiveness detecting module includes:

a detecting unit, configured to determine the identifier of the application and the identifier of each active application;

a judging unit, configured to judge whether the identifiers of the mutually exclusive applications corresponding to the application identifier include the identifier of a detected active application; and a determining unit, configured to: if a judging result of the judging unit is positive, determine that the active applications include the mutually exclusive application of the application; otherwise, determine that the active applications do not include the mutually exclusive application of the application.

According to the determining result, the determining unit instructs the resource configuration module 1 to perform shutdown or stop scheduling correspondingly and perform a corresponding system resource configuration operation.

Further, specifically, the apparatus for configuring a resource may further include a storage module configured for storing a resource configuration mapping table, where the resource configuration mapping table stores the application sub-scenarios of the application and the corresponding system resource occupation information of the application sub-scenarios; and the corresponding information recorded by the recording module 4 is stored through the storage module. When the resource configuration module 1 allocates system resources to the application, the resource configuration module 1 specifically allocates system resources to the currently active application sub-scenario of the application according to the system resource occupation information corresponding to the identifier of the application sub-scenario of the application in the resource configuration mapping table stored in the storage module.

Based on the embodiments described above, the present invention has the following advantages:

In this embodiment of the present invention, on one hand, the application in the system is decomposed into application sub-scenarios, and system resources are configured for the application sub-scenarios. Therefore, enough system resources are ensured to meet the requirements for running the application sub-scenarios in the working application, and the running performance is ensured; the system resources are configured for the application sub-scenarios at a single attempt according to the recorded system resource occupation information, and no adjustment is required, which avoids the time waste caused by the adjustment. Moreover, this embodiment avoids too much power consumption caused by excessive resources configured at the beginning, makes good use of the system resources, reduces the power consumption of the system, and is more helpful for the user to run the currently operated application smoothly.

On the other hand, this embodiment of the present invention defines mutually exclusive applications of each application in the system. When an application is started, its mutually exclusive application that runs at the background is detected and shut down, or scheduling of the mutually exclusive application is stopped, which avoids system resource waste caused by the mutually exclusive application that runs at the background. Therefore, the system resources are saved, the power consumption of the system is reduced, more system resources are released and available to a new active application, and the user is facilitated to run and use the application.

Persons of ordinary skill in the art should understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a read-only memory (Read-Only Memory, ROM), a random access memory (Random Access Memory, RAM), and the like.

The above are merely exemplary embodiments of the present invention. However, the protection scope of the present invention is not limited thereto. Therefore, equivalent changes derived according to the claims of the present invention shall fall within the protection scope of the present invention.

What is claimed is:

1. A method for configuring system resource within an electronic device, comprising:
allocating system resource within the same electronic device to correspond to only a currently active application sub-scenario within an application according to previously recorded system resource occupation information for the application sub-scenario within the application, wherein:
the application sub-scenario within the application comprises performing a relevant portion of an entire function from running only a partial portion of the entire active application within the same electronic device;
defining an application sub-scenario of a new application according to a use scenario of the newly added application when the newly added application is detected;
testing the newly added application, and recording system resource occupation information of the defined application sub-scenario of the newly added application when the defined application sub-scenario works in the test process;
if the active application includes a mutually exclusive application of the application, shut down or forbid scheduling of the mutually exclusive application, and allocate a system resource to the currently active application sub-scenario of the application according to the recorded system resource occupation information of the application sub-scenario of the application; and
the previously recorded system resource occupation information of the application sub-scenario within the application were priorly performed when the application sub-scenario works in a process of testing the application after the currently active application sub-scenario within the application is defined.

2. The method according to claim 1, wherein prior to allocating the system resource to the currently active application sub-scenario within the application according to the previously recorded system resource occupation information, the method further comprises:
defining an application sub-scenario of the application according to a use scenario of the application; and
testing the application, and recording system resource occupation information of the defined application sub-scenario of the application when the application sub-scenario works in the test process.

3. The method according to claim 1, further comprising:
defining an application sub-scenario of a modified application according to a use scenario of the modified application when modification of the application is detected; and
testing the modified application, and recording system resource occupation information of the defined application sub-scenario of the modified application when the application sub-scenario works in the test process.

4. The method according to claim 1, further comprising:
deleting an application sub-scenario defined for a deleted application and system resource occupation information of the application sub-scenarios, when a deletion of the application is detected; and/or
deleting a deleted application sub-scenario of the application and system resource occupation information of the application sub-scenario, when deletion of the application sub-scenario of the application is detected.

5. An apparatus, comprising:
a processor, configured to allocate system resource within the same apparatus to correspond to only a currently active application sub-scenario within an application according to previously recorded system resource occupation information for the application sub-scenario within the application, wherein:

the application sub-scenario within the application comprises performing a relevant portion of an entire function from running only a partial portion of the entire active application within the same apparatus;

the apparatus is configured to:

define an application sub-scenario of a new application according to a use scenario of the newly added application when the newly added application is detected;

test the newly added application, and record system resource occupation information of the defined application sub-scenario of the newly added application when the defined application sub-scenario works in the test process;

if the active application includes a mutually exclusive application of the application, shut down or forbid scheduling of the mutually exclusive application, and allocate a system resource to the currently active application sub-scenario of the application according to the recorded system resource occupation information of the application sub-scenario of the application; and the previously recorded system resource occupation information of the application sub-scenario within the application were priorly performed when the application sub-scenario works in a process of testing the application after the currently active application sub-scenario within the application is defined.

6. The apparatus according to claim 5, wherein:

the processor is further configured to: define an application sub-scenario of a new application according to a use scenario of the newly added application when the newly added application is detected, test the newly added application, and record system resource occupation information of the defined application sub-scenario of the newly added application when the application sub-scenario works in the test process.

7. The apparatus according to claim 5, wherein:

the processor is further configured to: define an application sub-scenario of a modified application according to a use scenario of the modified application when modification of the application is detected, test the modified application, and record system resource occupation information of the defined application sub-scenario of the modified application when the application sub-scenario works in the test process.

8. The apparatus according to claim 5, wherein:

the processor is further configured to delete an application sub-scenario defined for a deleted application and system resource occupation information of the application sub-scenario when a deletion of the application is detected;

and/or, further configured to delete a deleted application sub-scenario of the application and system resource occupation information of the application sub-scenario when deletion of the application sub-scenario of the application is detected.

9. The apparatus according to claim 5 wherein the apparatus is implemented in an electronic device.

10. A non-transitory computer readable storage medium storing a computer program code, the computer program code comprising instructions for executing a method by a computer for configuring system resource within an electronic device, comprising:

allocating system resource within the same electronic device to correspond to only a currently active application sub-scenario within an application according to previously recorded system resource occupation information for the application sub-scenario within the application, wherein:

the application sub-scenario within the application comprises performing a relevant portion of an entire function from running only a partial portion of the entire active application within the same electronic device;

defining an application sub-scenario of a new application according to a use scenario of the newly added application when the newly added application is detected;

testing the newly added application, and recording system resource occupation information of the defined application sub-scenario of the newly added application when the defined application sub-scenario works in the test process;

if the active application includes a mutually exclusive application of the application, shut down or forbid scheduling of the mutually exclusive application, and allocate a system resource to the currently active application sub-scenario of the application according to the recorded system resource occupation information of the application sub-scenario of the application; and the previously recorded system resource occupation information of the application sub-scenario within the application were priorly performed when the application sub-scenario works in a process of testing the application after the currently active application sub-scenario within the application is defined.

* * * * *